(12) United States Patent
Turner

(10) Patent No.: US 7,993,548 B2
(45) Date of Patent: Aug. 9, 2011

(54) METHOD OF MANUFACTURING A VESSEL

(75) Inventor: Bruce R. Turner, Exeter, NH (US)

(73) Assignee: Bioinnovations Oy, Espoo (FI)

(*) Notice: Subject to any disclaimer, the term of this patent is extended or adjusted under 35 U.S.C. 154(b) by 0 days.

(21) Appl. No.: 12/264,868

(22) Filed: Nov. 4, 2008

(65) Prior Publication Data
US 2009/0117648 A1 May 7, 2009

Related U.S. Application Data

(63) Continuation of application No. 11/515,868, filed on Sep. 6, 2006, now abandoned.

(60) Provisional application No. 60/714,726, filed on Sep. 6, 2005.

(51) Int. Cl.
*B29C 45/00* (2006.01)
*B29C 45/56* (2006.01)

(52) U.S. Cl. ...................................... 264/2.2; 264/328.7

(58) Field of Classification Search .................. 264/2.2, 264/328.7
See application file for complete search history.

(56) References Cited

U.S. PATENT DOCUMENTS

| | | | |
|---|---|---|---|
| 4,856,533 A | | 8/1989 | Anraku et al. |
| 5,376,313 A | * | 12/1994 | Kanewske et al. ............. 264/1.1 |
| 5,922,266 A | * | 7/1999 | Grove ......................... 264/297.2 |
| 6,290,882 B1 | * | 9/2001 | Maus et al. ..................... 264/2.2 |
| 7,041,247 B2 | * | 5/2006 | Nagaoka et al. ............ 264/328.7 |
| 2001/0051112 A1 | | 12/2001 | Gulzow et al. |
| 2003/0148401 A1 | | 8/2003 | Agrawal et al. |
| 2003/0180192 A1 | | 9/2003 | Seippel |
| 2005/0084957 A1 | | 4/2005 | Atwood et al. |

FOREIGN PATENT DOCUMENTS

| | | |
|---|---|---|
| DE | 20210900 | 11/2003 |
| EP | 0836884 | 4/1998 |
| EP | 1300462 | 4/2003 |
| EP | 1316360 | 6/2003 |
| JP | 2002079557 | 3/2002 |
| WO | WO-2004/054715 | 7/2004 |

OTHER PUBLICATIONS

Johannaber, F. et al., "Handbuch Spritzgiessen" 2001, Carl Hanser Verlag, Munchen; Wien, XP002434825, pp. 417-420, sentence 6, table 6.4.
Friedrichs, B. et al., "Spritzpraegen duennwandiger thermoplastischer formteile," Kunststoffe, Carl Hanser Verlag, Munchen, DE, vol. 80, No. 5, May 1, 1990, pp. 583-587, XP000165074.

* cited by examiner

*Primary Examiner* — Jill L Heitbrink
(74) *Attorney, Agent, or Firm* — Wood, Herron & Evans, LLP

(57) ABSTRACT

The invention concerns a novel sample tube and a method of manufacturing a such a sample tube. According to the method an oversized mold cavity is formed with an opposing pair of mold members of an injection molding machine, the mold members being movable relative to each other and between which mold members the sample tube is formed. A volume of resin exceeding the prescribed volume of the sample tube is injected into the cavity and force is applied to said mold members in order to reduce the volume of said mold cavity for displacing molten polymer in the cavity and for compressing the polymer to form said sample tube. By means of the invention, sample tubes and vessels having ultra thin walls can be manufactured.

8 Claims, 5 Drawing Sheets

METHOD OF MANUFACTURING A VESSEL

This application is a Continuation of co-pending application Ser. No. 11/515,868 filed on Sep. 6, 2006, and for which priority is claimed under 35 U.S.C. §120; and this application claims priority under 35 U.S.C. §119(e) on U.S. Provisional Application No(s). 60/714,726 filed on Sep. 6, 2005; the entire contents of all are hereby incorporated by reference.

BACKGROUND OF THE INVENTION

1. Field of the Invention

The present invention is related to plastic vessels for thermal cycling applications. In particular, the present invention provides plastic vessels with ultra thin walls allowing for efficient heat transfer in apparatus for thermal cycling applications as well as methods and instruments for the manufacture thereof.

2. Description of Related Art

A typical thermal cycling procedure is the performance of the polymerase chain reaction (PCR). Generally, the purpose of PCR is production (or amplification) of larger volumes of DNA which are identical in chemical makeup to minute volumes of native DNA obtained from limited sources. PCR is performed by utilizing a thermally controlled enzymatic reaction to make identical copies of double stranded DNA found in minute initial samples and then using those copies to generate other identical copies in successive cycles. Ideally each cycle will double the amount of DNA present. An extension of PCR for amplification is an analytical method known to those skilled in the art as quantitative PCR (also known as real time PCR) This method involves the real time monitoring of the amount of DNA product produced in each successive amplification cycle.

Generally speaking, PCR requires that the sample to be amplified, along with the other reaction components, be sealed into a reaction vessel and be incubated at two different temperatures, the first being for primer hybridization and primer extension reaction and the second being for denaturation. The latter step comprises separation of the double stranded DNA into single strand templates for use in the next successive hybridization and extension cycle. Typical temperature cycles require that the reaction mix be held with great accuracy (+/−0.3 degrees C.) at each incubation temperature for prescribed periods of time and that the identical cycle or one substantially similar be repeated many times, typically as many as 30. The incubation temperatures of the steps within a given cycle may range from 94 degrees C. to 37 degrees C.

It is desirable to change from temperature to temperature within a given cycle as rapidly as possible primarily for two reasons:

1. The enzymatic reaction has optimal temperatures for each step and strict adherence to those temperatures results in far more efficient DNA amplification.
2. The length of a given cycle is determined by the need for the reaction mixture to be held at each incubation temperature for a specified period time. Time spent transitioning between temperatures adds to the cycle time and, given the large number of cycles required, typically about 30, contributes greatly to the overall time required to complete the PCR process.

This having been said, the fact remains that as regards the elapsed time to perform a set of laboratory protocol steps, in which PCR is one of the those steps, PCR will be the rate limiting step. Thus, a primary objective of those familiar with the process is to decrease the overall time required to perform PCR.

Since the reaction mix is an aqueous solution, as the high reaction temperatures, near the boiling point of water, are encountered, a portion of the reaction mix goes into vapour phase and a pressure increase inside the sealed sample tube is induced. Since a loss of the vapour from the sealed sample vessel would result in a change of concentration of the reaction mix components, producing the potential effect of a PCR reaction failure and loss of precious sample, it is imperative that the method of sealing the reaction vessels be robust.

Typically, temperature cycling of the vessels containing the reaction mix for the PCR reaction has been accomplished in one of two ways:

1. The more widely utilized method is to use a thermal cycling instrument comprised in part of a temperature controlled, highly thermally conductive sample block having wells of a geometry matching that of the portion of the disposable reaction vessel which contains the reaction mix. The geometric match of the mating areas of the vessel and the block provide intimate contact and a resultant thermal system consisting essentially of three components: the instrument's sample block/associated heat pump components, the vessel which contains the reaction mix (typically moulded plastic) and the reaction mix itself.

The minimum cycle time limitation of PCR performed using these instruments, has, in general, been the thermal mass of the sample block and related heat pump components of the instrument system. Recent technical improvements in some commercially available instruments have decreased the cycle time of the instrument's sample block such that the thermal mass of conventional moulded plastic PCR vessels may be defined as the rate limiting factor for thermal transfer to the reaction sample itself, e.g. the rate limiting factor of the minimum overall time required for PCR.
2. The second, and less encountered, method is to use an instrument consisting of several fixed temperature liquid baths, typically water, between which the vessels are automatically moved according to the dictates of the PCR protocol. This method is typically encountered in a high throughput situation where it is desirable to process many vessels simultaneously.

Of course, in this case the vessel comes in intimate contact with the liquid so, again, the thermal mass of conventional plastic thin walled PCR vessels may be defined as the rate limiting factor for thermal transfer to the reaction sample itself, e.g., the rate limiting factor of the minimum overall time required for the total PCR protocol.

There are a number of commercially available thermal cycling vessels and accompanying sealing systems. The vessels are available in a number of formats including single tubes, tubes arranged in tray type arrays, typically known as multi-well plates, compatible with automated laboratory equipment and also strips of attached tubes, typically arranged with a tube center to center distance matching that found in one dimension of the multi-well plates. The single tubes and strips of tubes are generally sealed by means of a moulded cap or strip of caps that fit securely into the mouth of the tube(s). These caps may be separate or integral to the tube(s) It is reasonable to say that the single tubes and strips of tubes are produced exclusively via typical high pressure injection moulding processes.

The multi-well plate format has become the preferred format for many thermal cycling applications. Currently there are two methods of producing the multi-well plates. One of the early, and still utilized, methods of manufacture is via conventional thermoforming methods in which a sheet of plastic compatible with this manufacturing technique is heated to the softening point and forced to conform to the shape of a form which is the negative of the geometry of the multiwell plate. This method has the advantage of producing a low cost part with low thermal mass and very thin tube wall thicknesses. Such a product is offered in a 96 tube format by the Corning-CoStar company of Kennebunk, Me.

Unfortunately the drawbacks of this method result in a part unsuitable for nearly all latter day applications for several reasons:

1. Since the raw material is a thin sheet of plastic, the resultant multi-well plate has little structural integrity and no compatibility with automated plate handling equipment due to lack of rigidity.
2. The thermo-forming technique is a very imprecise process which offers no control over cross-sectional thinning as the softened plastic is drawn into the shape of the part. As a result, the concentricity of the formed tubes diameter is extremely poor. An examination of typical commercially available multi-well plates revealed wall thickness dimensions within given wells with variations as much as 6× (0.001" to 0.006").
3. A narrow selection of materials is available for use in the thermo-forming process. Few of these are optimal for use in PCR protocols and those that are, are not optimal for the thermo-forming process. Typical commercially available thermoformed plates are manufactured of polycarbonate sheet stock.
4. The thermoforming process is not conducive to forming small, consistently well defined features such as raised geometry around mouths of tubes, for instance to improve sealing performance.

Due to the limitations cited with respect to thermoformed plates, high-pressure injection moulding has become the preferred method of manufacture for multi-well plates. High-pressure injection moulding has allowed the introduction of multi-well plates with many desirable features such as:

1. Tube wall thickness on the order of 0.009" (2.3 mm) which is suitable for use in many thermal cycling protocols performed in standard thermal cycling equipment.
2. Increased rigidity such as is found in the HardShell multi-well plate from MJ Research/Biorad or the Twin Tec multi-well plate from Eppendorf, both produced by injection moulding processes.
3. Ability to form precise geometric features such as raised rims around the mouths of tubes which permit secure sealing using a wide variety of sealing systems such as films which may be heat sealed to the rims, elastomeric pads which form a very effective gasket seal against the raised rims of the multi-well plate when sealing pressure is applied over the pad surface.
4. A variety of materials are compatible with high-pressure injection moulding.

Commercially available injection moulded sample vessels in various formats for use in thermal cycling are currently offered by a number of companies. Several injection moulded thermal cycling vessels are currently marketed as "thin wall" and include products available from Applera Corporation and from MJ Research/BioRad Laboratories of Hercules, Calif. The BioRad Laboratories product is marketed under MJ Research's trade name "HardShell" These are typically touted as having "thin" walls with typical nominal thickness of the thin wall section of between 0.009 inch and 0.015 inch (0.23 mm to 0.38 mm). One such product, in the format of a single tube with attached cap, is described in Published US Patent Application No. 2005/0084957, dated 21 Apr. 2005 and assigned to Applera Corporation of Foster City, Calif. Similar products have been commercially available for a number of years.

In any event, thermal cycling vessels with wall sections in this dimensional range do not approach the reduction in wall thickness required to take full advantage of the faster thermal cycling capabilities of the latest instrument technology. Further, careful examination of the thin wall areas of these commercially available injection moulded PCR vessel tubes will often reveal a lack of concentricity between the inner and outer diameters of the thin wall sections of the tubes. In the case of some micro-titer plates differences of 2× or greater may be observed. This is undesirable because it leads to uneven heat transfer to the reagent sample and consequently a less efficient PCR reaction.

As the previous narrative illustrates, the technology of thermal cycling instrumentation is advancing to the point that the thermal cycling instrumentation is no longer the rate limiting factor in thermal cycling. Rather, conventional thermal cycling vessels become the rate limiting step in the performance of PCR. Therefore there is an emerging need for a new multi-well plate design and method of manufacture, which affords the benefits of manufacture by the injection moulding process but possesses thinner tube walls than manufacture by currently known injection moulding methods will allow.

One German company, Analytic Jena, currently offers an alternative style ultra thin wall plate for PCR. It is a sort of hybrid which is formed by joining two components using two different manufacturing processes, e.g. tubes are formed by thermoforming/vacuum forming the tube shapes from polypropylene sheet into an array of 36 holes preformed in an injection moulded superstructure. Unfortunately, the resultant part has several undesirable features, which render it impractical for the bulk of laboratory applications for multi-well plates. This disposable vessel is designed to fit only their instrumentation, which possesses the industry standard tube-to-tube offset distance but none of the other industry standard geometry. Hence their consumable is not compatible with other existing thermal cycling instrumentation nor is it compatible with any other industry standard laboratory equipment used upstream or downstream of the thermal cycling step. The polypropylene sheet thermo-forming step results in a thin tube (approximately 0.0035" (0.9 mm) thick wall) but a tube with little structural integrity; e.g. the tubes are easily crushed and deformed if not carefully handled. Additionally, the thermoforming process is not very flexible and does not allow for the formation of tubes with the depth required to accommodate standard sample volumes and to fit in standard thermal cycling equipment. Further, these processes do not allow the formation of geometry, e.g. rims around the mouths of the tube, to provide enhanced sealing of the tubes during thermal cycling.

As one can appreciate, the Analytic Jena product does not offer a practical solution to the market's need for a thermal cycling vessel which offers extremely thin and concentric tube walls, in a geometry essentially similar to conventional tubes, together with the other features and benefits of conventional injection moulded thermal cycling vessels. Until the disclosures of these claims there has not been a practical way to commercially produce a product that combines all these features and benefits.

While thermal cycling vessels may necessarily possess relatively complex geometry, they are considered one-time use, hence cost is a consideration. Injection moulding is a relatively economical manufacturing process for production of polymer products possessing relatively complex geometry and it also provides all the previously mentioned features and benefits so therefore is the preferred process for manufacturing thermal cycling vessels As applied to the products described herein, the primary limit of the conventional injection moulding process is the minimum achievable wall thickness: In the case of polypropylene the minimum wall thickness that can be consistently filled without troublesome inclusions or weakly bonded "knit lines" (areas where two polymer fronts meet and marry together) is approximately 0.007 inch-0.009 inch (0.18 mm to 0.23 mm). As previously stated, manufacturers currently sell as "thin wall", thermal cycling vessels with wall sections in this dimensional range but the products do not approach the reduction in wall thickness required to take advantage of the faster thermal cycling capabilities of the latest instrument technology.

In basic terms, conventional high pressure injection moulding is performed utilizing automated equipment which, at extremely high pressures and rates of speed, meter precise amounts of molten polymer into one or more cavities of a two piece mould, each cavity matching the negative of the geometry of the part to be moulded (with allowances for the shrink rate during cooling of the polymer used). The process steps may be generally described as:

1. Bringing the two pieces (halves) of the mould together such that the mating cavity portions in each mould half form one geometry which is the negative of the shape of the part to be formed.
2. Injection through one or more orifices (gates) in each cavity, of sufficient molten polymer to fill the cavity completely.
3. Allowing the part(s) to cool (solidify) sufficiently that it may be removed from the mould.
4. Opening the two halves of the mould such that the cooled part(s) may be removed or ejected from the cavity(-ies).

Since the molten polymer enters the mould cavity at only the prescribed areas (gates), as it flows to fill the complex geometry of the cavity, cooling begins to occur. To completely fill the part it is important to maintain the flow of polymer in the cavity. Particularly with complex part geometry, as the polymer begins to cool at the point where it contacts the mould and its viscosity increases, greater pressure on the hottest material at the entrance (gates) of the cavity is required to maintain flow. In the case of very thin polypropylene wall sections, cooling happens very rapidly and a "soft skin" of polymer of approximately 0.0015 inch (0.038 mm) thick forms at the polymer/mould surface interface. This effectively reduces the flow area further in the thin wall area and effectively limits the achievable thickness of the thin wall to that mentioned above.

As regards internal stress within the part, the aforementioned cooling and fill pressure issues, combined with the fact that the chains of polymer molecules are often forced to align themselves in several directions simultaneously to fill the cavity, can lead to residual stresses in the finished part.

EP 1 618 954 A1 teaches a tube of steel construction which has a biologically inert interior coating, for instance polymer. Steel-containing tubes are not beneficial because of the costs and complexity related to the manufacturing process.

DE 4022792 and GB 806482 teach various methods of forming a vessel from a film of polymer by stretching the film. While the resulting product is of total polymer construction, using these techniques, the tube wall thickness has to be relatively constant over the whole product. This limits their use significantly, as the starting polymer film thickness defines the thickness range of the whole product. Also, no complex shapes can be manufactured.

U.S. Pat. No. 5,922,266 discloses a method of injection moulding, wherein the mould cavity is squeezed while injecting molten polymer into the cavity. The method aims at producing optically high quality articles such as contact lenses and plastic layers of optical discs. The optical properties of the article to be moulded are improved because of the reduced internal stresses of the product and reduced number of optical distortions due to the equalization of pressurization by the shrinking cavity and gradual cooling of the polymer. A similar method is disclosed in U.S. Pat. No. 4,707,321. Neither of the documents relate to manufacturing of vessels for biological assays or exceedingly thin object portions in general.

One special kind of plastic vessel and its manufacturing process by conventional injection moulding is disclosed in WO 2004/054715.

SUMMARY OF THE INVENTION

It is an aim of the present invention to provide a new resin-based sample tube construction, which offers superior performance over prior art due to thinner wall structure.

It is another aim of the invention to provide a method of manufacturing such sample tubes.

It is a further aim of the invention to provide a novel mould arrangement or instrument.

The present invention is based on the idea of providing a unique design for mould construction combined with unique injection moulding machine programming which allows for the manufacture of injection moulded parts whose design parameters require portions of the part to have very consistent ultra thin walls (0.0025 inch to 0.0065 inch (0.0635 mm to 0.165 mm)).

The vessel according to the invention comprises at least one sample cavity having a predetermined volume. At least one part of the vessel is capable of receiving a sample. In the vicinity of that part, there is provided a thin wall portion which has a consistent wall thickness of less than about 0.0065 inch (less than about 0.17 mm). The vessel is made from an injection-mouldable thermoplastic material. Generally, the vessel is hardened under compression of the thermoplastic material.

In the method according to the invention, a vessel for thermal cycling applications is produced by delivering plasticized resin into a mould cavity sufficient to fill the cavity, then evenly displacing a portion of that resin within the cavity by compressing the resin by the walls of the cavity, typically by clamping with core pins which form the internal diameter (ID) of the sample tube, to form the desired wall thickness. The resin is then allowed to cool in the pressurized cavity thereby forming an ultra thin-walled vessel.

More specifically, the vessel is mainly characterized by what is stated in claim 1.

The method according to the invention is characterized by what is stated in claim 5.

Considerable advantages are obtained by the invention. Specifically, the unique design for the tube portion of injection moulded vessels for thermal cycling which incorporates a thin wall portion which is as much as or less than half the thickness of that currently known to those skilled in the art (essentially a nominal thickness of 0.0035 inch to 0.0065 inch (0.089 mm to 0.165 mm) in the thin wall area). Typical applications of the invention are microtiter plates of various forms, single tube constructions and tube strips.

In particular, proposed is a unique design for the tube portion of injection moulded vessels for thermal cycling which incorporates a thin wall portion which is as much as or less than half the thickness of that currently known to those skilled in the art (essentially a nominal thickness of 0.0035 inch to 0.0065 inch in the thin wall area). While this design describes a non-manufacturable product if production is attempted by known injection moulding techniques, utilizing the moulding techniques described herein allows for manufacture of an entire product line of economical, disposable thermal cycling vessels which meet industry standard formats and offer the much sought after benefit of very high thermal transfer efficiency. While this design may be incorporated in any of the various current formats of thermal cycling vessels, it may just as well be incorporated into ones not yet envisioned.

Thus, to mention an example, the present thin wall process technology can be applied to other vessel formats than the one described below, e.g. to higher density arrays such as a 384 well slidetiter format plate. The formats may not have conical tubes as will be described in more detail, but rather they may have, for example, essentially square wells separated only by a thin wall and tube bottom. As will be understood, there will be a number of formats of thermal cycling vessel that will benefit from the present ultra thin wall construction.

To produce tubes with ultra thin walls, latter day high pressure, high speed injection moulding machines, particularly all electric versions, can be used for delivering molten polymer to the mould with incredibly high levels of volumetric precision, at high speeds and pressures not previously achievable with most older machines. This level of precision and control is required to successfully develop a robust process utilizing the mould design and process proposed in the following detailed description.

We have found that mechanical clamping of the polymer before and also during the hardening of the polymer results in a structure of very uniform quality. This is of special importance in thermal cycling applications, as the vessel has to withstand high and rapid temperature transitions. The importance of clamping is even emphasized when vessels having ultra thin walls are produced and used.

Next, the embodiments of the invention and its further advantages will be examined more closely with the aid of a detailed description and with reference to the attached drawings.

DETAILED DESCRIPTION OF THE INVENTION

Figure 1A:
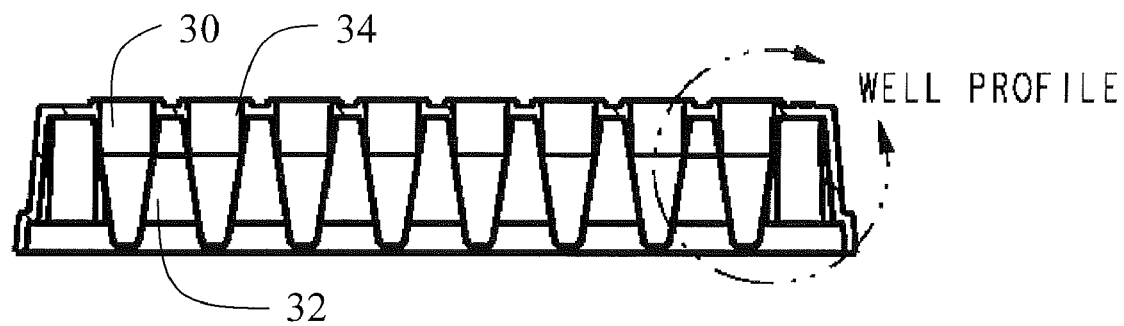
FIGS. 1a and 1b depict a microtiter plate between mould members in the moulding stage.
Figure 1B:
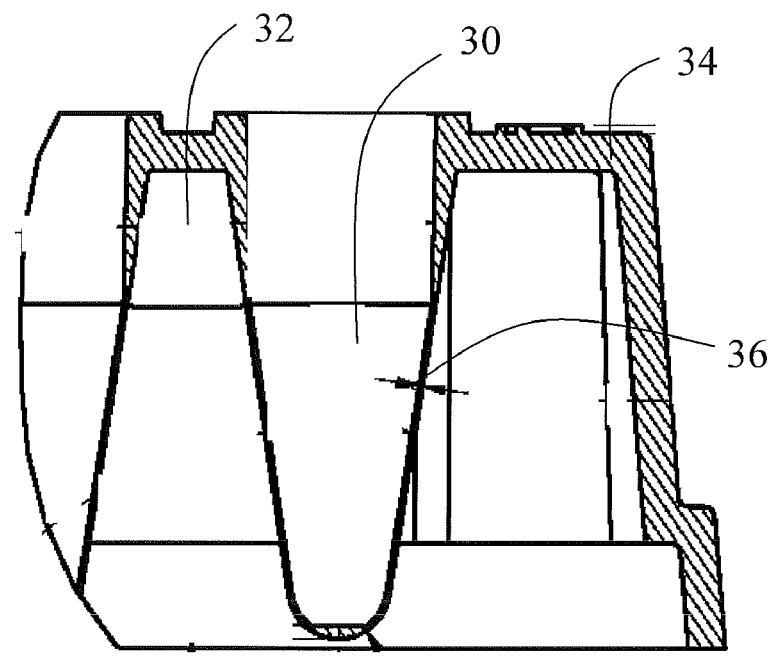

FIGS. 1a and 1b show a vessel 34 clamped between mould members. The upper mould member comprises core pins 30, which define the internal diameter (ID) and the internal shape of the wells. The lower mould member 32 defines the outer diameter (OD) and shape of the wells. The thin wall portion of the wells is denoted with the reference numeral 36 in FIG. 1b.

According to an embodiment of the invention, proposed is a mould design and accompanying process method which allows for, in the case of the tube type products 34, the mould cavity to be closed while the core pins 30 which form the ID of the tube portion of the part be held back from completely closing while the an amount of polymer to completely fill the mould is metered in. The OD of the tubes is formed by at least one counterpart 32. Of course, with the core pins still partially open/retracted, the cavity volume is greater than that of the mould cavity with core pins fully in place. Fill continues until the mould cavity is filled. At the moment the fill step is completed the core pins 30 compress to their final position. This action applies a compressive force to the shot of molten polymer now trapped in tube region of the cavity. This compressive force displaces excess molten polymer in the tube region and creates an essentially equalized packing of the molten polymer in the rest of the cavity while simultaneously compressing the polymer residing in the tube cavity area down to the desired ultra thin wall dimension. The formed part is then allowed to cool sufficiently in the mould to allow extraction of it from the mould without deformation.

Thus, the mould can be arranged at least in first and second configurations, the first configuration exhibiting a larger cavity volume and at least one feed opening for the resin and the second configuration having a reduced volume. The amount of polymer which is injected into the cavity in the first configuration must equal at least the volume of the cavity in the second configuration, however, preferably equaling the volume of the enlarged cavity. The displacement of the core pins between the two positions can be, for example, 0.01"-0.2" (0.254 mm to 5.08 mm), preferably 0.1-0.15" (2.54 mm to 3.81 mm), typically approximately 0.125" (3.18 mm).

The closing of the core pins does two things. Firstly, it compresses the tube walls to the desired thickness, and, secondly, evenly displaces the polymer from the tube areas to produce an equalized packing force on the part prior to cooling.

The mould members, which form the mould cavity, i.e., the core pins 30 and the counterpart 32, are each typically formed of one single unit but may comprise also several units. The mould members are preferably rigid or well supported for preventing deformation-caused inaccuracies in the resulting product. The first mould member 30 preferably comprises as many pins as there are wells in the desired product in order to give shape to the upper (first) surface of the product. The second member 32 has a form, which corresponds to the relief of the lower (second) surface of the plate.

Thus, the sample tubes can be manufactured by using a high-precision injection moulding machine. According to a preferred embodiment, the method according to the invention comprises the following steps:

a mould cavity having a size larger than the desired size of the sample tube by an amount equal to the shrink factor of the resin, is formed by using an pair of relatively movable, generally opposing mould members of the injection moulding machine, while holding back from complete closing the core pins which form the ID of the sample tube, a volume of plasticized resin, whose volume and mass is at least equal the desired volume and mass of the sample tube or plate to be formed, is injected into the mould cavity, the polymer resident in the tube wall cavity area is displaced by the compressing of the core pin(s) forming the ID of the tube(s) thus displacing it with an equalized force on the geometry of the part outside of the tube wall area and thus performing a final pack and stress equalization of the entire part, and allowing the tube to cool sufficiently so that it may be removed from the cavity without deformation.

As is apparent to a person skilled in the art, similar cavity size decreasing effect is achieved by compressing with the counterpart 32 forming the OD of the tubes (and, accordingly, the second surface of the plate).

The polymer resin used can be any injection-mouldable thermoplastic resin suitable for the application concerned. In addition, the material should withstand the conditions typical for thermal processing of biological samples, involving heating cycles increasing the temperature up to more than 80° C. The material should also exhibit good hydrophobicity and low interference with molecular biological reactions. Examples of suitable materials include various polyolefine grades, polyesters and polycarbonates. A particularly preferred material is polypropylene, preferably of a grade suitable for melt processing, e.g. by injection moulding, pressure forming, vacuum forming, extrusion moulding or blow moulding. The polypropylene can be nucleated or non-nucleated and it can contain heat and light stabilizers, antistatic agents, antioxidant as well as fillers, such as mica, calcium carbonate, talc and wollastonite, and pigments, such as carbonate, titanium dioxide, carbon black, quinacridone, phtalocyanine blue and isoindolinone. Other thermoplastic resins suitable for the present purposes are various high-quality polyethylene, polybutylene and poly(ethylene terephthalate) grades. In addition, the base material of the sample tubes is compatible with the PCR process. The plates can be treated after moulding, for example, to biologically enhance their surface properties. The melt-flow index range of the resin can be chosen or adjusted for optimal compliance with the present method.

Nucleated resins are employed in microplate applications primarily for improved clarity of the tube walls. Such resins can also be subjected to the present method. Ultra thin wall tubes can also be made of clear or pigmented resin. Typical pigments include whitening and blackening pigments.

Generally, the present method is suitable even for thicknesses below about 0.0065 inch (about 0.17 mm). As known in the art, in particular by those skilled in the molding technology, using conventional molding processes, polypropylene will not consistently fill cross-sections of less than 0.007 inch to 0.009 inch, the achievable thickness being dependent upon size of area and part geometry.

Figure 3:
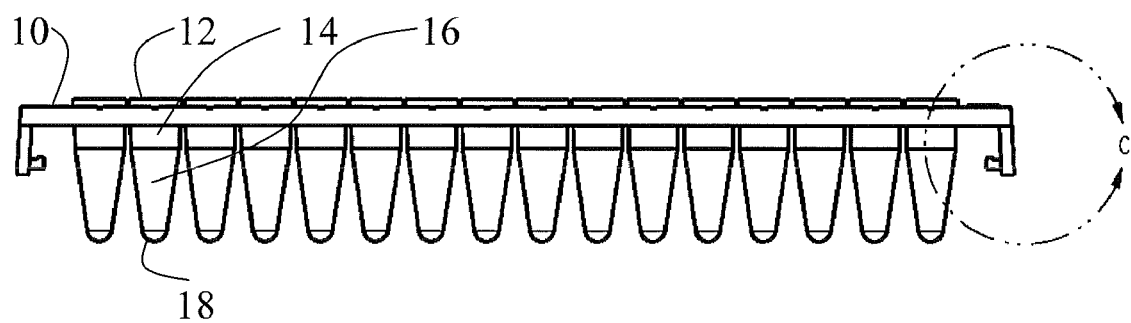
FIG. 3 shows a general side view of a microtiter plate comprising a plurality of sample tubes.

Referring to FIG. 3 the vessel according to the invention can comprise a single tube with or without attached cap, a one dimensional array having a plurality of sample tubes arranged in a line (microtiter strip) or in a two-dimensional grid (microtiter plate). The upper surface of the strip or plate is denoted with the reference numeral 10. The sample tubes protrude downwardly, away from the upper surface 10, such that their openings 12 remain on the upper surface. The tubes are formed of an upper wall portion 14, a lower wall portion 16, and a bottom portion 18.

Figure 2A:
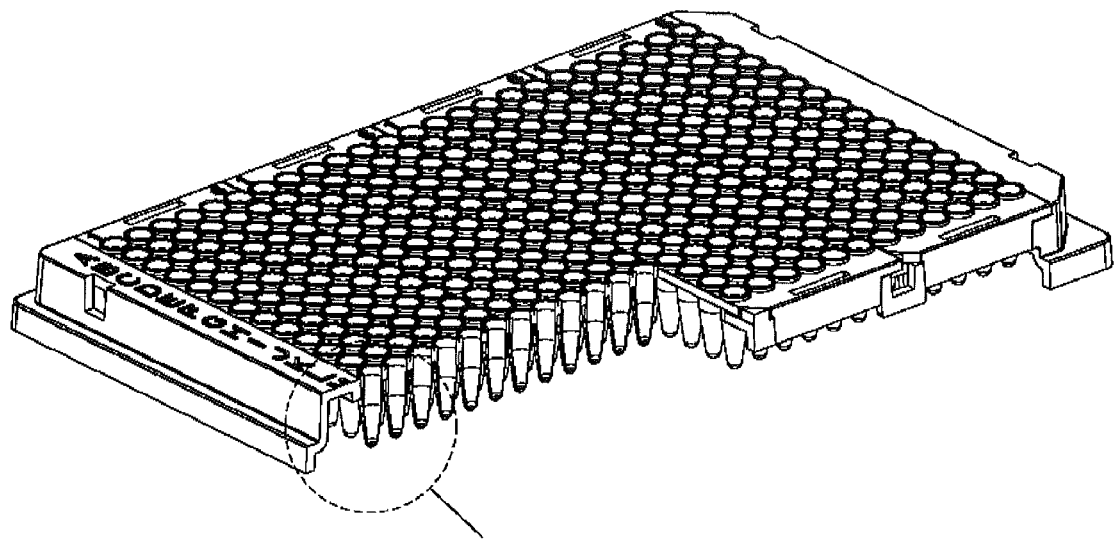
FIG. 2a shows a general perspective view of an ultra thin-walled microtiter plate.
Figure 2B:
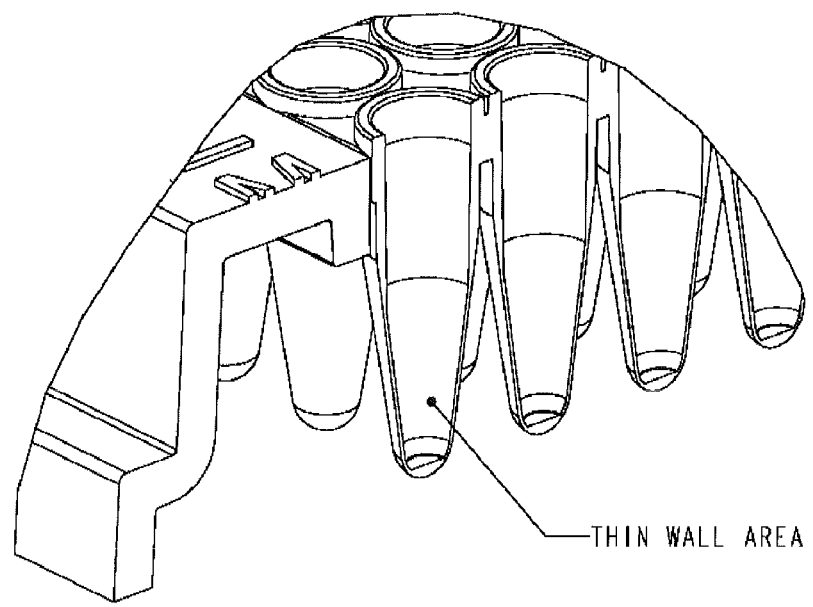
FIG. 2b shows a detailed perspective view individual tubes of a microtiter plate.
Figure 2C:
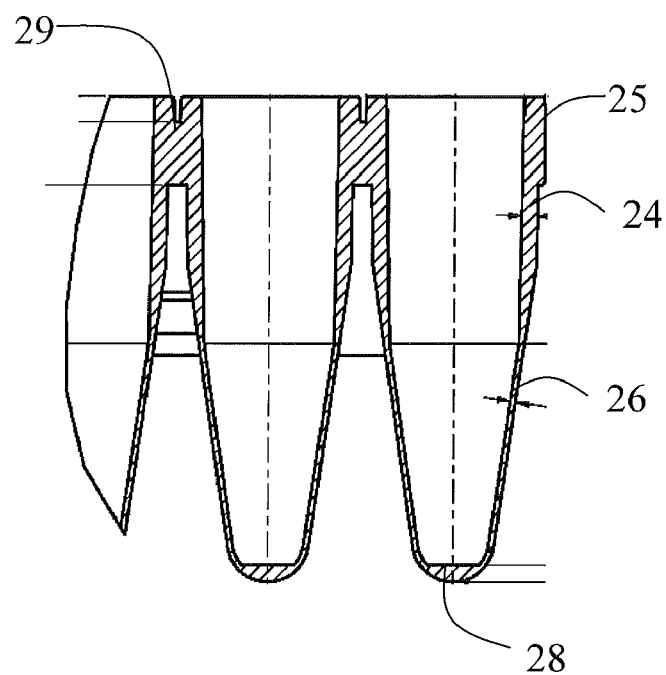
FIG. 2c illustrates a detailed cross-sectional view of sample tubes according to a an embodiment of the invention.

FIGS. 2*a* to 2*c* show a preferred structure of the vessel and the tubes in detail in three different views. In a typical embodiment, the upper wall portion 24 extends downwardly from the surface of the plate at an essentially right angle, or slightly tapering. A conically beveled lower wall portion (thin wall portion) 26 extends from the upper wall portion 24 continuously such that the wall thickness is reduced. Thus, the lower wall portion 26 is connected to the upper wall portion from its wider end. The shape of the upper wall portion is conically tapering towards the bottom 28 of the tube, which closes the structure. The bottom portion 28 can be made thicker than the lower wall portion to increase the strength of the structure but can also have the same thickness as the lower wall portion. If the vessel comprises a plurality of tubes, the tubes are typically connected to neighbouring tubes from the upper wall portions 24 by necks 29. In that case, each of the sample tubes in the vessel is connected from its cylindrical upper wall portion to neighbouring tubes a neck 29. Thus, the necks 29 form the upper surface of the plate. The sample tubes can also comprise shoulders, as described in the published patent application no. US 2005/0,084,957.

The wall thickness of the upper wall portion 24 can be, for example 0.009-0.030 inches (0.23 mm to 0.76 mm). By using the method described in this document, the thin wall portion 26 can be manufactured to have a uniform wall thickness of 0.0025 to 0.0065 inch (approximately 0.06-0.17 mm). That is, the heat capacity and thermal resistance of the main heat transfer surfaces of the product can be reduced even to a third, and even less, of what has been achieved hitherto. The thermal conductance of the vessel is therefore increased significantly, whereby the temperature ramping speeds of the heating and cooling phases of a PCR process are increased. That is, the thermal contribution of the vessel diminishes as its mass becomes smaller in relation to the mass of the sample.

Another unique feature of this moulding method is a self-aligning feature of the mould design which allows for precision alignment of moving parts of the mould providing very tight tolerances and high degree of concentricity in regard to the inner and outer diameters of the thin wall area of the tube(s). This issue is important to achieve optimal concentricity of the OD and ID of the sample tube, as it greatly affects the predictability and reliability of PCR processes are concerned.

Thus, the present injection moulding process provides a range of variation of the wall thickness down to 0.002, even down to 0.001 inch, and even below. The consistency of the thickness of the thin wall sections of the tubes can be increased in relation to prior microplates. Maximum deviations from the desired wall thickness can usually be kept below 25%, even below 10%, depending on the shape of the tube and wall thickness. This leads to more even heat transfer to the reagent sample and, further, more efficient PCR reaction. Moreover, generation of weak knit lines can be avoided to a high degree because of the mechanical pressurization by the mould members, which efficiently evens out such joints.

Figure 4A:
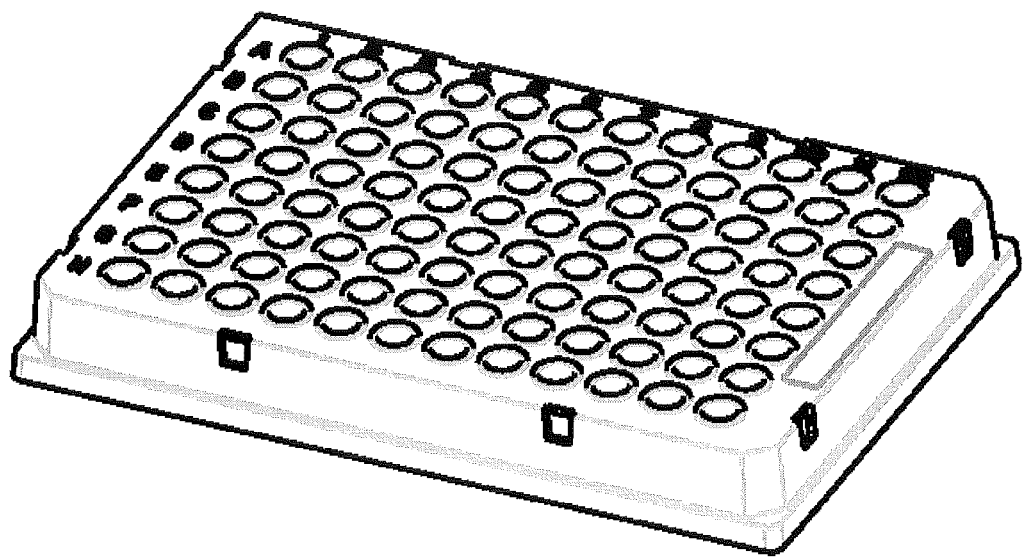
FIGS. 4a and 4b show perspective views of a microtiter plate from the top and bottom side, respectively.
Figure 4B:
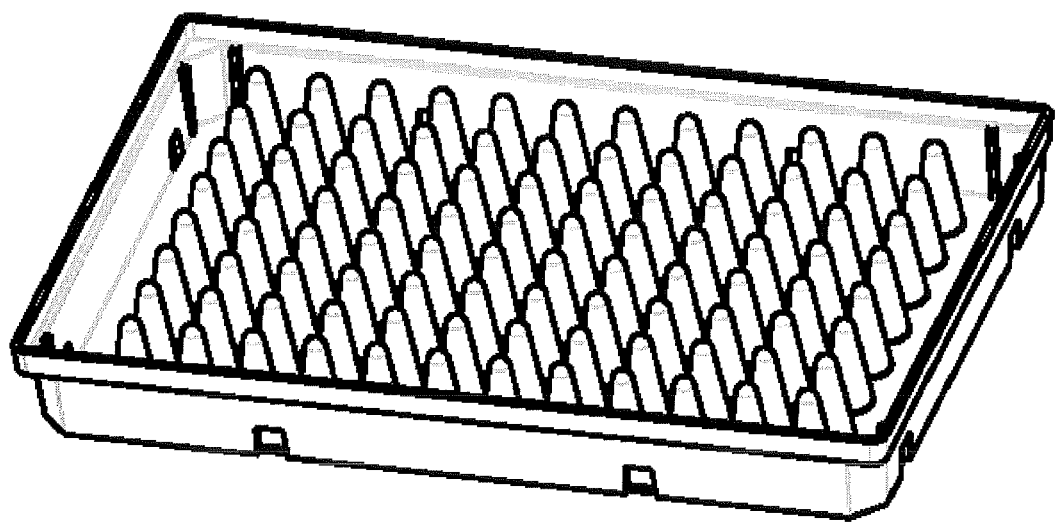
Figure 5A:
FIGS. 5a to 5c shows an embodiment, where ultra thin walled tubes are arranged in the form of a strip.
Figure 5B:
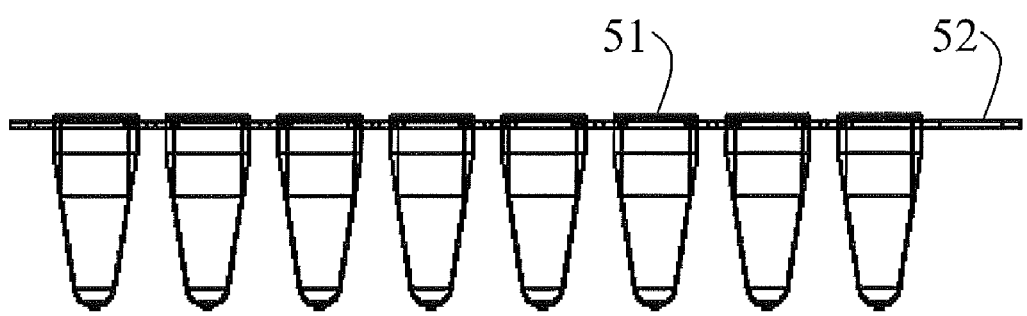
Figure 5C:
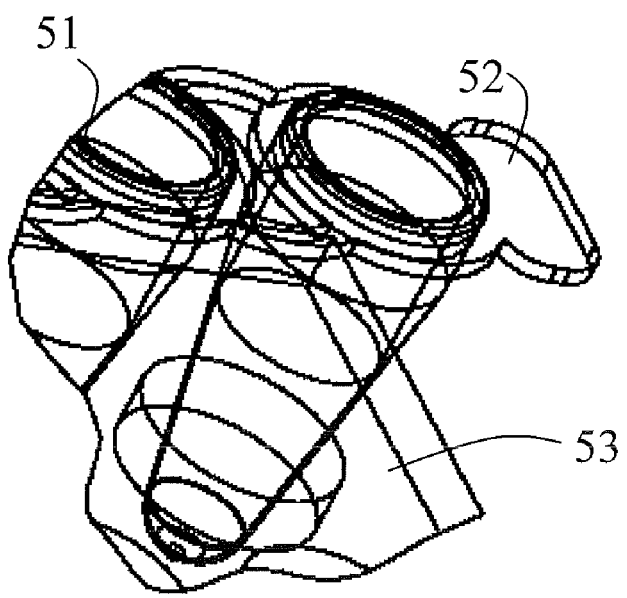

FIGS. 4*a* and 4*b* show an embodiment, where the vessel in the form of a complete microtiter plate. FIGS. 5*a* to 5*c* show an embodiment in which the vessel is in the form of a one-column strip having individual tubes 51 and a handling element 52. As shown in FIG. 5*c*, the strip can be placed in a base plate having openings for the tubes in order to form a bigger plate unit.

In the following, the equipment and operation of injection moulding of sample tubes according to one embodiment are shortly described.

The moulding machine preferably comprises a clamping unit, a clamping control unit, an injecting unit, an ejector unit and a power transmission unit.

The clamping unit comprises at least two clamping members movable relative to each other and between which the clamping force is generated. The mould cavity is formed in the zone between the members of the clamping unit by providing resilient mould members, which have been shaped according to the desired form of the vessel to be produced. At least one of the clamping members is connected to a clamping shaft part of the power transmission unit. The clamping shaft can be, for example, a hydraulic press or servo motor actuated mechanical linkage. The clamping control unit controls the movement of the clamping member, for example, responsive to the ongoing clamping process (e.g., pressure in the mould cavity or the distance of the clamping members) through a feedback connection.

The injector unit distributes an amount of molten resin that equals or slightly exceeds the volume of the mould cavity between the mould members at a desired phase of operation. The overall process can be controlled by a process control unit, which typically comprises a computer.

Clamping of the resin enables the production of thinner structures than traditional injection-only methods. The resin is kept in plasticized form long enough to spread evenly through the thin wall portion of the mould by clamping the plasticized resin. Cooling of the resin can take place either passively by natural redistribution of the heat of the resin or actively by an appropriate cooling system preferably thermally connected to at least one of the mould members. Such a cooling system can comprise, for example, a liquid circulation system. A controller can cause coolant to move through mould channels to speed the cooling.

The injection and core pin compression can be done as multistage process. Such a process can comprise a first stage of fast injection, which ensures an even distribution of molten resin into the cavity and removal of gases, and a second stage of slower injection accompanied by compression of the core pins. During the first stage, the mould members are placed in a closed state whereby the cavity(ies) in the negative shape of the part is formed. Within the cavity(ies) the core pin(s) is (are) held back from completely closing such that the molten plastic (melt) filling the wall area is thicker than the desired final wall thickness. First stage injection takes place very quickly to vent gases within the moulding cavity. Following this initial stage, a slower pressurization of the melt takes place and simultaneously the core pins are driven to their completely closed position causing redistribution of the melt isotropically. At the same time the polymer cools and solidifies under continuing pressure, causing the moulded part to conform to the mould members and correct for thermally-induced shrinkages. The initial stage of venting and relatively fast melt redistribution preferably lasts only approximately 1/20 to 1/5 as long as the second stage, which in turn is continued throughout the remainder of the mould cycle, until just before the mould is opened and the part ejected.

The mould remains in a closed state until the melt drops below the solidification temperature of the plastic. Once this point is reached, the mould can be opened. The rate of curing depends on the rate at which heat is withdrawn from the melt.

The mould members are preferably moved relative to each other in a direction defined by the depth axis of the wells. However, especially when manufacturing individual sample tubes of one-dimensional tube strips, clamping procedures different to that can be used. The injection of the resin can take place from one or more injection points on the fringe area of the plate body 10, or, for example, on either the inner or outer surface of the tubes, preferably close to the bottom parts 28 of the tubes, which enables even distribution of the resin throughout the tube.

The invention claimed is:

1. A method of manufacturing a sample tube having a predetermined volume and mass, said method being carried out by injection moulding in an injection moulding machine using a molten thermoplastic resin, the method comprising the steps of:
    forming an oversized mould cavity with an opposing pair of mould members of said injection moulding machine, the mould members being movable relative to each other and between which mould members said sample tube is formed;
    injecting into said oversized cavities a volume of resin exceeding the prescribed volume of the sample tube to be formed, said injecting comprising a first stage of injection at a first speed followed by a second stage of injection at a second speed, with the second speed being slower than the first speed and the second stage of injection comprising a slower pressurization than the first stage of injection; and
    during said second stage of injection, applying force to said mould members to reduce the volume of said mould cavity for displacing molten polymer in the cavity and for compressing the polymer to form said sample tube and simultaneously cooling the polymer in compressed condition for preventing deformation of the sample tube.

2. The method according to claim 1, which further comprises the step of cooling the polymer in compressed condition for preventing deformation of the sample tube.

3. The method according to claim 1 or 2, wherein that the step of reducing the volume of the mould cavity comprises moving the mould members relative to each other such that the minimum distance between them is consistently less than 0.0065 inch at some part of the cavity.

4. The method according to claim 1, wherein the mould members comprise a core pin having the shape of the inner surface of the sample tube and its counterpart having the shape of the outer surface of the tube.

5. The method according to claim 4, wherein the step of reducing the volume of the mould cavity comprises moving the core pin relative to the injection moulding machine and relative to said counterpart.

6. The method according to claim 1, wherein the step of reducing the volume of the cavity comprises moving the mould members 0.01-0.2 inch to each other.

7. The method according to claim 6, wherein the step of reducing the volume of the cavity comprises moving the mould members 0.1-0.15 inch relative to each other.

8. The method according to claim 1, wherein the sample tube is part of a vessel comprising a strip or array of essentially similar sample tubes such as a microtiter plate having a plurality of tubes arranged in a grid.

* * * * *